Patented May 16, 1944

2,348,710

UNITED STATES PATENT OFFICE 2,348,710

ALICYCLIC ESTERS OF ALPHA-HYDROXY-ISOBUTYRIC ACIDS

Coleman R. Caryl, Riverside, Jack T. Thurston, Cos Cob, and Donald W. Kaiser, Springdale, Conn., assignors to American Cyanamid Company, New York, N. Y., a corporation of Maine No Drawing. Application November 6, 1940,
Serial No. 364,557

4 Claims. (Cl. 260—484)

The present invention relates to a new class of chemical compounds comprising the alicyclic esters of alpha-hydroxyisobutyric acid and the hydroxy substituted derivatives thereof.

This invention includes broadly any of the alicyclic esters of alpha-hydroxyisobutyric acid as well as such esters when the hydrogen of the hydroxyl group has been replaced by an alkali metal or by various organic radicals. The compounds may be represented by the following general formula:

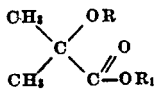

in which R may be hydrogen or an aliphatic, cycloaliphatic, aromatic, heterocyclic, acyl radical or an alkali metal and R₁ is an alicyclic radical.

These new compounds have a wide field of usefulness and considerable commercial importance in the arts. Most of the compounds are liquids having relatively high boiling points and are useful as solvents for nitrocellulose, resins, shellacs, dyes, lacquers, inks, and various coating compositions. Many of the compounds and particularly the hydroxy substituted derivatives are useful as plasticizers and modifiers for synthetic resins, nitrocellulose, cellulose acetate, cellulose propionate, cellulose ether and similar compositions. The esters of the present invention may be prepared by any of the methods ordinarily employed in the production of esters and the invention is not intended to be limited by any particular method for producing them. We have found that the alicyclic esters of alpha-hydroxyisobutyric acid can be prepared by reacting any suitable alicyclic alcohol, such as cyclohexanol, with the acid at elevated temperatures in the presence or absence of a catalyst such as sulfuric acid or p-toluenesulfonic acid. The esters may likewise be prepared by the ester interchange method or by reacting alicyclic halides with an alkali metal salt of alpha-hydroxyisobutyric acid.

Any alicyclic alcohol may be used for producing the esters in accordance with the present invention, representative members of which are the cyclohexanol derivatives, such as cyclohexanol itself and methyl cyclohexanol, propyl-cyclohexanols, cyclohexane-1,4-diol, as well as alcohols such as menthol, fenchol, an borneol.

When compounds are to be produced in which the hydrogen of the hydroxyl group is replaced by some other radical, it may be desirable in some instances to produce the alicyclic ester first, and then replace the hydrogen of the hydroxyl group with an organic radical such as for example, an acyl radical, and in other cases it may be desirable to replace the hydrogen of the hydroxyl group with an acyl group prior to the production of the ester.

Among the various acyl radicals that can be used to replace the hydrogen of the hydroxyl group are the aliphatic acyl radicals such as formyl, acetyl, propionyl, butyryl, octanyl and carbonic.

The acyl radical may also be that of a cycloaliphatic acid such as cyclohexyl acetic acid, camphoric acid and the like. The acyl radical may likewise be an aromatic radical such as those of benzoic acid or salicyclic acid. Dicarboxylic acids may also be used to acylate the hydroxyl groups in which case two molecules of alpha-hydroxyisobutyric acid are combined with one molecule of the dicarboxylic acid, or the mono-esters of the dicarboxylic acids may be employed in which case one molecule of alpha-hydroxyisobutyric acid will combine with one molecule of the mono-ester of the dicarboxylic acid. Among the various dicarboxylic acids and mono-esters which can be used are those such as succinic, oxalic, diglycolic, sebacic, maleic, naphthalene dicorboxylic, phthalic, chlorophthalic, nitrophthalic, and the like. Ether-acids may also be employed to produce acylated alicyclic esters of alpha-hydroxyisobutyric acid in which case R in the general formula represents the radical of an ether-acid such as:

n-Butoxyacetic acid

(Beta-n-butoxyethoxy) acetic acid

(Beta-(beta'-n-butoxyethoxy)ethoxyl)acetic acid

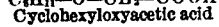
Cyclohexyloxyacetic acid

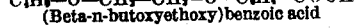
(Beta-n-butoxyethoxy)benzoic acid

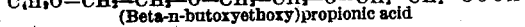
(Beta-n-butoxyethoxy)propionic acid

The hydrogen of the hydroxyl group may also be replaced by heterocyclic acids under certain conditions such as for example the radical of nicotinic acid.

As pointed out heretofore the hydrogen on the hydroxyl group may be replaced by an acyl radical either prior to the production of the alicyclic ester of alpha-hydroxyisobutyric acid or the ester may be prepared first and then the hydroxyl group acylated. In most cases the acid halides may be used to replace the hydrogen of the hydroxyl groups as for example, acetyl chloride may be used to produce alpha-acetylated esters or acids.

Ethers of the alicyclic esters of alpha-hydroxyisobutyric acid are produced when the hydrogen of the hydroxyl group is replaced by either an alkyl, cycloaliphatic, aralkyl, or aryl group and such ether esters have properties differing somewhat from the esters themselves. The alkyl radicals used to replace the hydrogen may be either saturated or unsaturated and may or may not contain substituent groups. Included in this group of alkyl radicals are the methyl, ethyl, propyl, butyl, isobutyl, octyl, as well as alkyl radicals containing carboxylic and oxy groups in the chain to produce compounds such as the following:

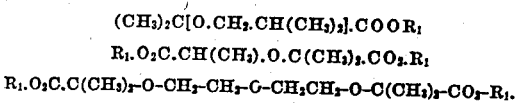

The hydrogen may also be replaced by alicyclic radicals such as cyclohexyl, methyl cyclohexyl, etc.

The various aralkyl radicals may also be used to replace the hydrogen such as benzyl, phenethyl, phenylpropyl, naphthylmethyl, diphenylmethyl, diphenylethyl, cinnamyl, etc.

The hydrogen of the hydroxyl group may be replaced by any of the aliphatic, alicyclic, heterocyclic, or aromatic radicals mentioned above by reacting the sodium salt of the alicyclic esters of alpha-hydroxyisobutyric acid with the desired aliphatic, alicyclic, heterocyclic, or aromatic halide or sulfate.

The hydrogen of the hydroxyl group of the alicyclic esters of alpha-hydroxyisobutyric acid may also be replaced by groups possessing ketones or aldehyde radicals. For example, halogenated ketones may be reacted with the sodium salt of the alicyclic esters of alpha-hydroxyisobutyric acid to split off sodium chloride and substitute the ketone radical in place of the hydrogen of the hydroxyl group. For example, when chloroacetone is reacted as described above the following compound is produced:

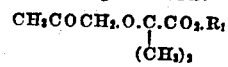

The corresponding aromatic ketones may be used instead of acetone. When chlorinated aldehydes are employed the aldehyde radical replaces the hydrogen of the hydroxyl group.

The carbonic acid esters of the alicyclic esters of alpha-hydroxyisobutyric acid can be prepared by reacting the alicyclic ester with, for example, ethyl chloroformate to produce the alpha-carbethoxy aromatic ester.

Various metal radicals may be used to replace the hydrogen on the hydroxyl group of the esters and particularly active metals such as the alkali metals, sodium and potassium. These salts are produced by adding sodium or potassium to the alicyclic ester of alpha-hydroxyisobutyric acid in an inert solvent and refluxing. In some cases it is more desirable to prepare the sodium or potassium salts by reacting the aromatic ester of alpha-hydroxyisobutyric acid with the metallic alkoxides in an inert solvent such as toluene and remove the alcohol by distillation.

The invention will be further described in conjunction with the following specific examples, but they are for the purpose of illustration only and the invention is not strictly limited to the exact conditions set forth therein.

EXAMPLE 1

Cyclohexyl alpha-hydroxyisobutyrate

A reaction mixture consisting of 100 grams of cyclohexanol, 132 grams of ethyl alpha-hydroxyisobutyrate and about 2.0 grams of paratoluenesulfonic acid was placed in a round-bottomed flask fitted with a 12-inch Vigreaux column and a distillation head which controlled the ration of reflux to draw-off. The heating was continued for 12 hours. The temperature of the oil bath was maintained at 165° C. until the reaction approached completion and was then gradually increased to 215° C. During this time the temperature at the still head did not rise above 77° C. and 46 cc. of a possible 58 cc. of ethyl alcohol was obtained. The residue was distilled without further treatment at reduced pressure. The cyclohexyl alpha-hydroxyisobutyrate weighing 100 grams distilled at 84° C./4 mm. and had a saponification equivalent of 190.

EXAMPLE 2

Bornyl alpha-hydroxyisobutyrate

A mixture of 77 grams (0.5 mol) of borneol, 62.5 grams (0.6 mol) of alpha-hydroxyisobutyric acid, 5 drops of concentrated sulfuric acid, and 260 grams (2.84 mols) of dry toluene was placed in a flask which was attached to a moisture trap connected with a condenser. The temperature of the reaction mixture was maintained at 111° C. which was sufficient for reflux. At the end of 16 hours of refluxing a total of 8.4 cc. of water had been collected. The toluene solution was washed twice with water, dried over sodium sulfate, and the toluene removed under reduced pressure on a steam bath. The dark brown residual oil was distilled under reduced pressure, giving 64.0 grams of colorless liquid with a boiling range of 93°–114° C./3.5 mm. Refractionation of the bornyl alpha-hydroxyisobutyrate gave 42.0 grams or a 35% yield of colorless oil which distilled at 99°–100° C./3.5 mm. and had a saponification equivalent of 242.

EXAMPLE 3

Menthyl alpha-hydroxyisobutyrate

Following the procedure as given in the preceding example, a mixture of 78 grams (0.5 mol) of menthol, 62.5 grams (0.6 mol) of alpha-hydroxyisobutyric acid, and 100 cc. of high flash naphtha was maintained at a reaction temperature of 180° C. for five and three-quarter hours, giving a total of 15.2 cc. (0.845 mol) of water. Distillation gave 66.0 grams of a colorless liquid which boiled from 81°–116° C./4 mm. Refractionation yielded 43 grams or a 35.6% yield of odorless menthyl alpha-hydroxyisobutyrate which boiled at 89°–90° C./2 mm. and had a saponification equivalent of 245.

EXAMPLE 4

4-Methylcyclohexyl alpha-hydroxyisobutyrate

A mixture of 15 grams (0.132 mol) of 4-methylcyclohexanol, 16 grams (0.153 mol) of alpha-hydroxyisobutyric acid, and 0.4 gram (0.0021 mol) of p-toluenesulfonic acid was heated for three hours, giving a total of 2.5 cc. (0.139 mol) of water. After washing with water, the brown oil was dried over sodium sulfate and distilled under reduced pressure. A 56.5% yield (18.0 grams) of colorless 4-methylcyclohexyl alpha-hydroxyisobutyrate boiling at 88°–90° C./4 mm.

and having a saponification equivalent of 191 was obtained.

In the foregoing examples it is to be understood that the alpha-hydroxyisobutyric acid may be replaced in all or in part by hydroxy substituted derivatives to produce the corresponding alicyclic ester. Suitable hydroxy substituted compounds include those in which R of the general formula is an alkyl radical such as the ethyl; an aromatic radical such as phenyl; a cycloaliphatic radical such as cyclohexanyl; a heterocyclic radical such as pyridine; or an alkali metal and especially acyl radicals such as acetyl or carbethoxy radicals.

The above description and examples are intended to be illustrative only. Any modification or variation therefrom which conforms to the spirit of the invention is intended to be included within the scope of the claims.

We claim:
1. Compounds having the following general formula:

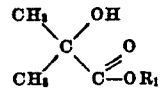

in which $R_1$ is an alicyclic radical.

2. As a new compound cyclohexyl alpha-hydroxyisobutyrate.

3. As a new compound menthyl alpha-hydroxyisobutyrate.

4. As a new compound bornyl alpha-hydroxyisobutyrate.

COLEMAN R. CARYL.
JACK T. THURSTON.
DONALD W. KAISER.